United States Patent
Babbage et al.

(10) Patent No.: US 8,419,120 B2
(45) Date of Patent: Apr. 16, 2013

(54) VEHICLE WITH A PANEL THAT IS MOVEABLE TO PROVIDE INCREASED HEAD ROOM ABOVE A REAR ROW OF SEATS

(75) Inventors: Jason Michael Babbage, Waterford, MI (US); Henry W. Hausler, Manchester, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 63 days.

(21) Appl. No.: 13/052,315

(22) Filed: Mar. 21, 2011

(65) Prior Publication Data

US 2012/0242104 A1    Sep. 27, 2012

(51) Int. Cl.
*B60J 7/00* (2006.01)

(52) U.S. Cl.
USPC .................. 296/216.02; 296/26.06

(58) Field of Classification Search ......... 296/26.06, 296/165, 166, 167, 169, 172, 173, 176, 216.02, 296/99.1
See application file for complete search history.

(56) References Cited

U.S. PATENT DOCUMENTS

| | | | | |
|---|---|---|---|---|
| 1,603,181 A * | 10/1926 | Aborn | ............ | 160/88 |
| 3,212,812 A * | 10/1965 | Kurtz | ............ | 296/176 |
| 3,953,066 A * | 4/1976 | Hamilton | ............ | 296/160 |
| 4,543,747 A | 10/1985 | Kaltz et al. | | |
| 4,758,038 A * | 7/1988 | Okada | ............ | 296/26.06 |
| 6,012,766 A | 1/2000 | Myles | | |
| 7,611,189 B2 | 11/2009 | Nielander et al. | | |
| 2004/0245794 A1 | 12/2004 | McManus et al. | | |
| 2007/0029830 A1* | 2/2007 | Wang | ............ | 296/26.06 |

FOREIGN PATENT DOCUMENTS

| | | | |
|---|---|---|---|
| DE | 3103062 A1 * | 8/1982 | |
| EP | 1916138 A1 * | 4/2008 | |

* cited by examiner

*Primary Examiner* — Glenn Dayoan
*Assistant Examiner* — Jason S Daniels
(74) *Attorney, Agent, or Firm* — Jason C. Rogers; Brooks Kushman P.C.

(57) ABSTRACT

A panel that may be raised and lowered in the rear area of a vehicle to provide added headroom. The panel may be secured to an opening defined by a roof of the vehicle. The panel may be secured to an opening defined in a tailgate of the vehicle. Side walls and a real wall may be provided that extend between the opening and the panel.

9 Claims, 4 Drawing Sheets

VEHICLE WITH A PANEL THAT IS MOVEABLE TO PROVIDE INCREASED HEAD ROOM ABOVE A REAR ROW OF SEATS

TECHNICAL FIELD

This invention relates to a roof for a vehicle that has a portion that is moved to provide increased headroom for rear seat passengers.

BACKGROUND

Fastback cross-over vehicles have a slanted rear roof area that provides reduced volume in the rear area of the vehicle. These types of vehicles may feature shared passenger compartments and cargo areas. The cargo area is normally accessed through a lift gate.

Cross-over vehicles may provide a third row of the passenger seats. A rear axle is normally located underneath the third row of seats which raises the height of the floor. The third row of seats is raised with respect to the first and second row passenger seats.

The combined effect of a slanted rear roof area and a raised floor and third row seat magnifies the problem of reduced headroom in fastback crossover vehicles.

Applicants' disclosure is directed to solving the problem of reduced headroom in fastback cross-over vehicles and other problems as summarized below.

SUMMARY

The foregoing problem is addressed by Applicants by providing a vehicle body structure in which a rigid panel disposed in the roof or the lift gate of the vehicle is raised to create additional headroom in the vehicle.

In one embodiment, a panel disposed in the roof of the vehicle is pivoted about a transverse axis at a front edge of the panel to raise the portions of the panel behind the front edge upwardly to provide extra headroom above a third, or rear, row of seats. Side walls and a rear wall extend from an opening defined by the roof to the side edges and rear edge of the panel. The side walls and rear wall in conjunction with the panel cover the opening defined by the roof when the panel is raised.

In another embodiment, a lift gate assembly is provided for a vehicle having a roof that is disposed above a location where a head of a passenger is located when seated in a rear seat and a rear wall that is disposed behind the passenger when seated in the rear seat. The roof and rear wall together define a lift gate opening that may be selectively opened and closed by the lift gate. The lift gate assembly comprises a lift gate body that has a top portion that closes a part of the lift gate opening in the roof and a rear portion that closes a part of the lift gate opening in the rear wall when the lift gate body closes the lift gate opening. A hinge connects a front edge of the lift gate body to the roof. A panel is attached to the top portion of the lift gate body and is movable between a flush position and a raised position.

In an additional embodiment, a panel assembly is connected to an opening in a roof in a vehicle to be selectively raised and lowered to provide additional head room above a third, or rear, row of seats. The panel pivots about a transverse pivot axis located at the front portion of the panel with the portion of the panel behind the front edge being raised. Side walls and a rear wall extend between an opening defined by the roof or the tailgate structure in conjunction with the panel to cover the passenger compartment when the panel is pivoted to the raised position.

These and other aspects of the Applicants disclosure will be better understood in view of the attached drawings and the following detailed description.

BRIEF DESCRIPTION OF THE DRAWINGS

FIGS. 4A-4C are a series of fragmentary cross-section views taken along the line 4-4 in FIG. 2 of one embodiment of the sidewall extending between the roof and the pivotal panel in which FIG. 4A shows the sidewall with the panel lowered, FIG. 4B shows the sidewall with the panel in an intermediate position in the process of being raised or lowered, and FIG. 4C shows the sidewall with the panel in the raised position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
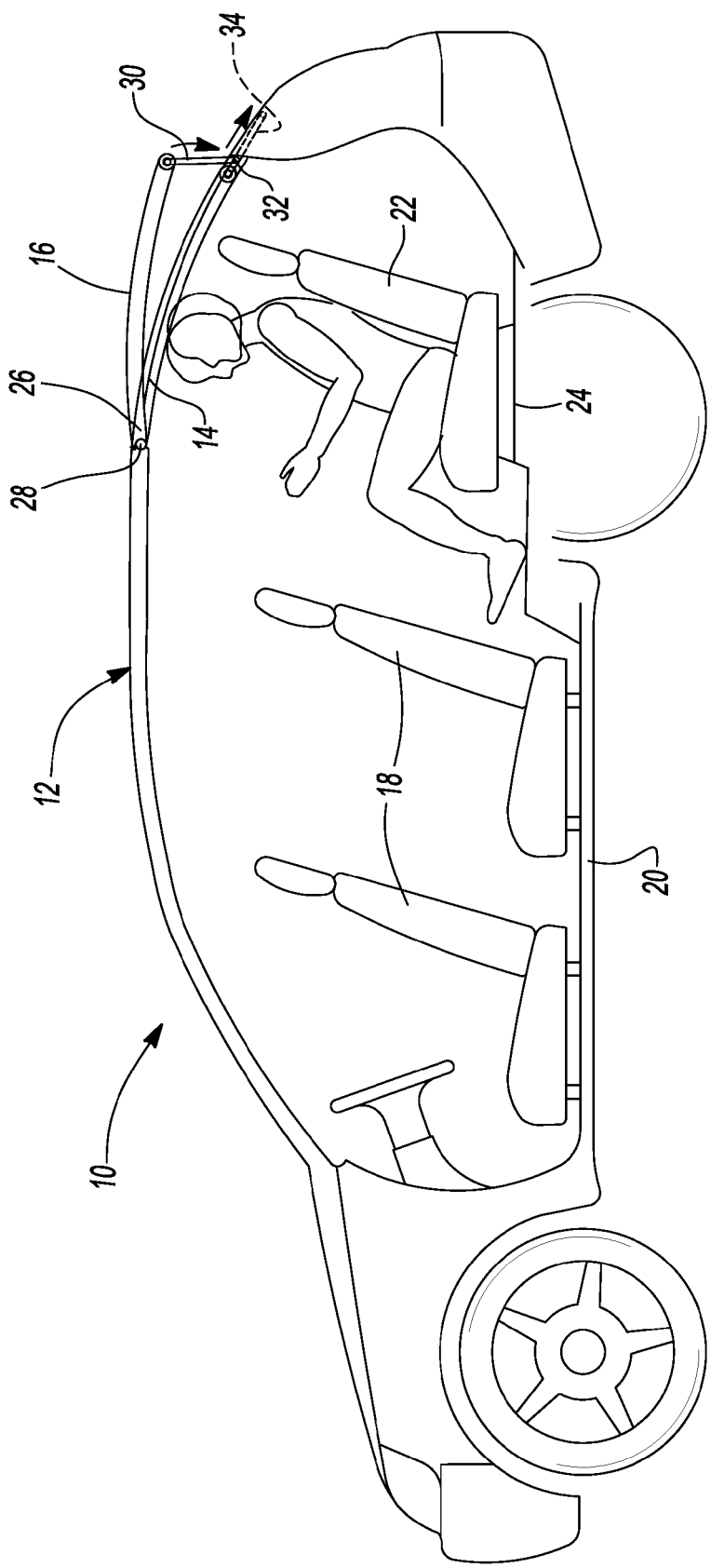
FIG. 1 is a diagrammatic cut-away view of a vehicle with a pivotal panel in the rear portion of the roof.

Referring to FIG. 1, a vehicle 10 that may be of the fastback cross-over body style has a roof 12 which slopes downwardly and rearwardly toward the rear of the vehicle 10. The roof 12 defines an opening 14 that may be closed or opened by a panel 16 that may be raised to provide increased headroom for passengers. The vehicle is provided with seats 18 that may be arranged in a front and middle row on the floor 20 of the vehicle 10. A rear row of seats 22 is attached to a raised floor area 24 of the vehicle 10 that is raised to provide clearance for the rear axle (not shown).

The panel 16 has a front edge 26 that is connected by a pivot connector 28, or hinge, to the roof 12 in the embodiment shown in FIG. 1. A rear wall 30 extends between the opening 14 and the panel 16. The rear wall 30 is provided with a follower 32 on both sides of the panel 16. Each follower 32 is received in a track 34 that is defined by or provided on the vehicle 10.

Figure 2:
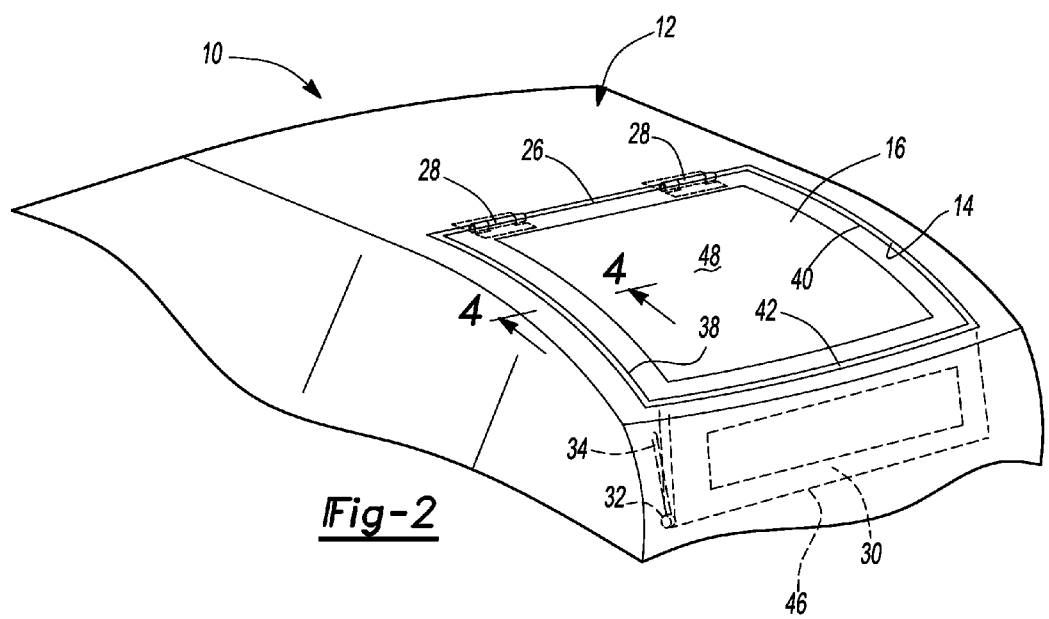
FIG. 2 is a left side/rear perspective view of the vehicle with a pivotal panel in the rear portion of the roof shown in FIG. 1 in a lowered position.
Figure 3:
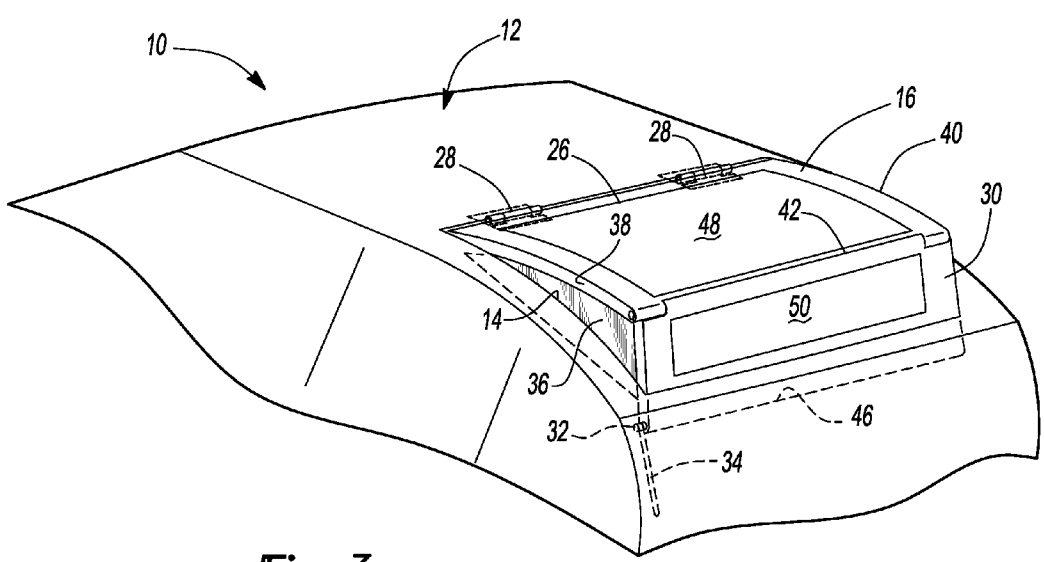
FIG. 3 is a left side/rear perspective view of the vehicle with a pivotal panel in the rear portion of the roof shown in FIG. 1 in a raised position.

Referring to FIGS. 2, the roof 12 is shown with the panel 16 in its closed or lowered position. In FIG. 3, the roof 12 is shown with the panel 16 in the open or raised position. The panel 16 moves relative to the opening 14 defined in the roof 12. The front edge 26 of the panel 16 is connected to the roof 12 by a pivot connector 28, or hinge. A rear wall 30 is recessed inside the vehicle 10, as shown in FIG. 2, but when the vehicle is in the open position, it extends above the roof 12, as shown in FIG. 3. The rear wall 30 is guided by the follower 32 in the track 34 that is shown in phantom lines in FIGS. 2 and 3.

The panel 16 includes side walls 36 that are provided on the right and left sides of the panel 16. The side wall 36 is shown in FIG. 3 to extend from the opening 14 to a left edge 38 of the panel 16. A right edge 40 of the panel 16 is shown, but the side wall 36 on the right side of the panel 16 is not visible. The right side wall 36 should be understood to be a mirror image of the left side wall 36 on the left side of the panel 16. A rear edge 42 of the panel 16 is connected to the rear wall 30. The rear wall 30 extends from the rear edge 42 of the panel 16 to the opening 14. A lower end 46 of the rear wall 30 is shown in phantom lines and is retained within the vehicle 10. A roof window 48 and a rear wall window 50 may be provided to improve visibility and increase light provided within the vehicle 10.

Figure 4A:
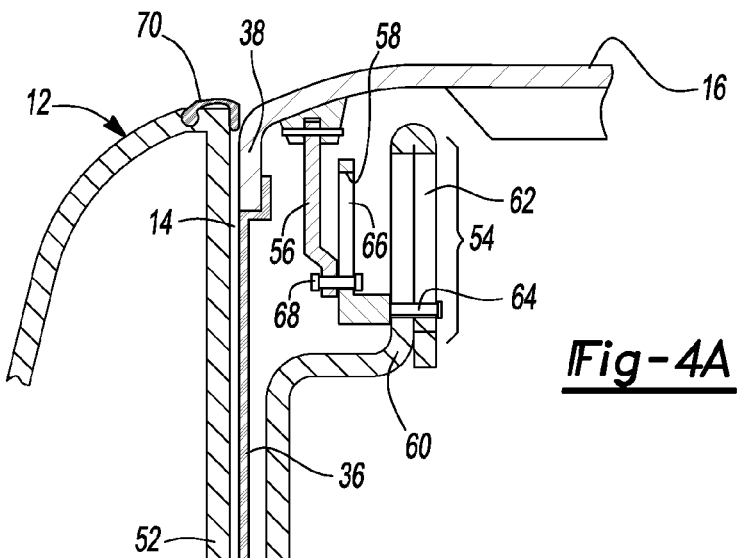
Figure 4B:
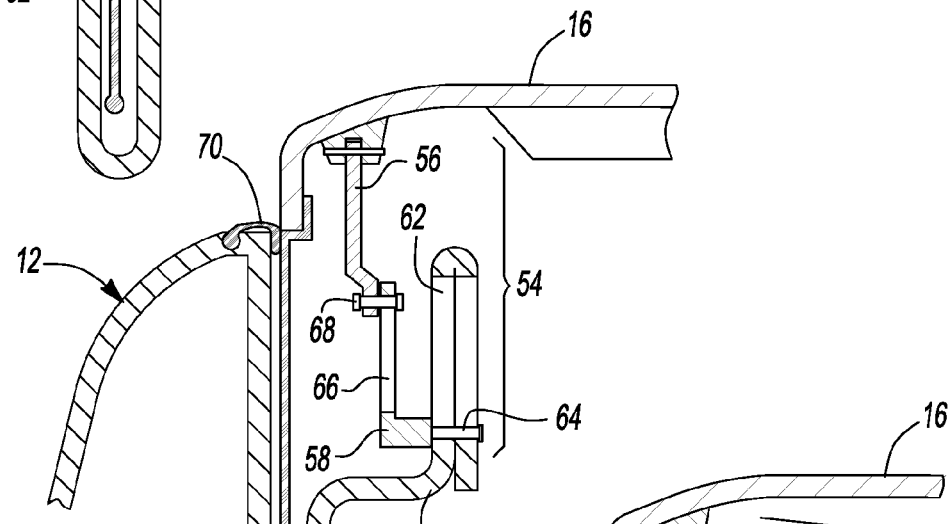
Figure 4C:
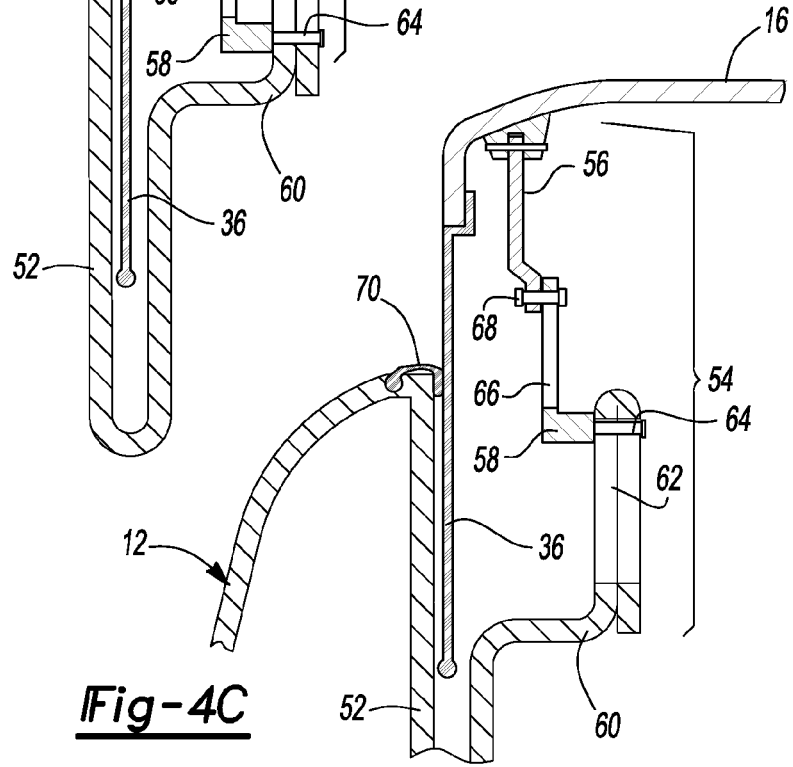

Referring to FIGS. 4A-4C, the structure and function of the side wall 36 will be described in greater detail. Referring to FIG. 4A, the panel 16 is shown in its lowered position in which it is flush with the roof 12 and closes the opening 14 defined by the roof 12. The left edge 38 of the panel 16 is attached to the side wall 36. A receptacle 52 is provided into which the side wall 36 may be retracted when the panel 16 is in its lowered position. A linkage 54 is provided to support the panel 16 in its raised position. The linkage 54 includes an upper link 56, an intermediate link 58 and a linkage support 60. Linkage 54 as shown in FIG. 4A is shown in its retracted position. A slot 62 is provided in the linkage support 60 that receives a pin 64. The pin 64 is attached to the intermediate link 58 and is movable within the slot 62. Another slot 66 is provided in the intermediate link 58 that receives a pin 68 that is provided on the upper link 56. A seal 70 is shown that seals between the roof 12 and the left edge 38 of the panel 16. The seal 70 may extend around all or part of the opening 14 in the roof 12.

Referring to FIG. 4B, the linkage 54 is shown in a partially raised position in which the panel 16 is in the process of being either raised or lowered. The side wall 36 is partially withdrawn from the receptacle 52. The upper link 56 is moved relative to the intermediate link 58 with the pin 68 having been moved to the upper end of the slot 66 in the intermediate link 58.

Referring to FIG. 4C, the side wall 36 is shown nearly fully extended from the receptacle 52. The panel 16 is supported by the upper link 56, the intermediate link 58 and the linkage support 60. The pin 64 that is secured to the intermediate link 58 is at the upper end of the slot 62 formed in the linkage support 60. The pin 68 attached to the upper link 56 is at the upper end of the slot 66 formed in the intermediate link 58. In this position, the panel is raised to its fullest extent and provides the maximum headroom for a passenger seated in the rearmost row of seats 22, as shown in FIG. 1.

Figure 5:
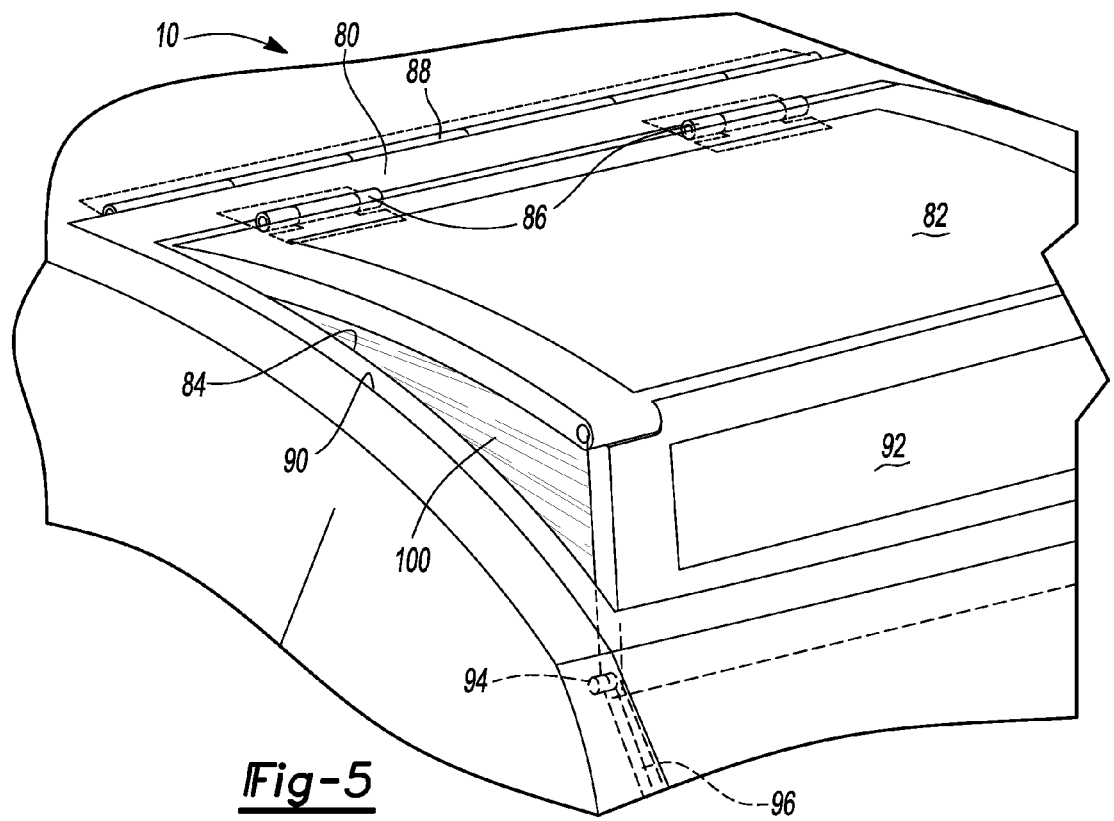
FIG. 5 is a left side/rear perspective view of another embodiment of a vehicle in which a lift gate assembly is provided with a movable panel that is in a raised position and that has a pleated side wall extending between the panel and an opening defined by the lift gate assembly.

Referring to FIG. 5, an alternative embodiment is illustrated in which a tailgate 80 of the vehicle 10 supports the panel 82. The panel 82 is movable relative to an opening 84 defined in the tailgate 80. One or more panel hinges 86 may be provided to connect the panel 82 to the tailgate 80. A tailgate hinge 88 is provided to connect the tailgate 80 to the vehicle 10. Hinges 86 and tailgate hinge 88 may be combined or separately provided as shown. A tailgate opening 90 defined by the vehicle 10 is selectively opened and closed by opening and closing the tailgate 80, as is well known in the art. A rear wall 92 is provided that extends between the panel 82 and the opening 84. The rear wall 92 is provided with at least one follower 94 that is received in a track 96, as previously described with reference to the embodiment of FIGS. 1-3.

Figure 6:
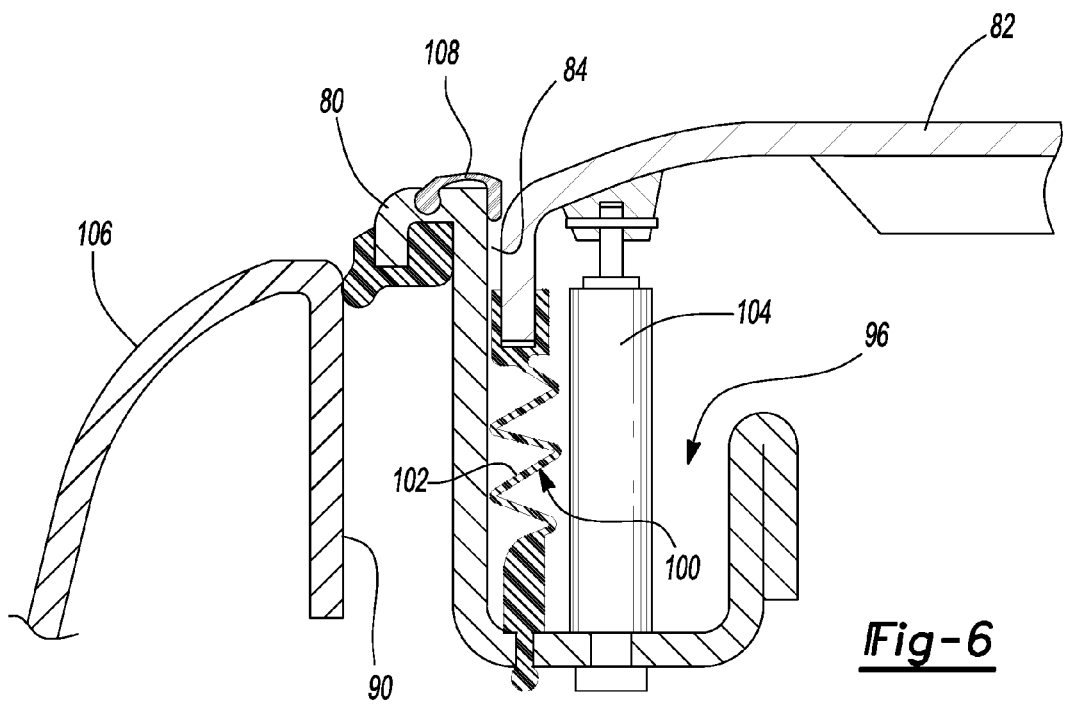
FIG. 6 is a fragmentary cross-section view showing the sidewall of the embodiment of FIG. 5 in a lowered position.

In the embodiment shown in FIGS. 5 and 6, a side wall 100 is provided between the panel 82 and the opening 84. The side wall 100 includes a plurality of pleats 102 that function in the manner of a bellows wall to seal and enclose the passenger compartment when the panel 82 is in its raised position.

As shown in FIG. 6, a hydraulic cylinder 104, or other lifting mechanism, may be provided to raise or lower the panel 82 relative to the opening 84. The side wall 100 is secured to the panel 82 between the panel and the opening 84. A roof, or more specifically roof rail 106 as illustrated, defines the tailgate opening 90. The tailgate 80 may be opened and closed with the panel 82 in either its raised or lowered position. A seal 108 is provided between the tailgate 80 and the panel 82 to seal the opening 84. When the cylinder 104 is extended, to the position shown in FIG. 5, the side wall 100 expands by unfolding the pleats 102 that are formed in the side wall 100.

It should be understood that the linkage 54, shown in FIGS. 4A-4C, and the hydraulic cylinder 104 may be interchanged between the two embodiments that are illustrated. In addition, many other types of linkages and panel support mechanisms may be developed to support the panel 16 or panel 82 in its raised position. Similarly, the pleated side wall 100 and rigid side wall 36 may be interchanged between the two illustrated embodiments.

The panels 16, 82 may be wholly or partially formed with transparent material, such as polycarbonate, plastic or glass that may be received in a frame or other supporting structure.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A panel assembly connected to an opening defined in a roof in a vehicle, the panel assembly may be selectively raised and lowered, the panel assembly comprising:
    a panel having a forward edge that is attached to the roof by a pivot connector;
    a receptacle extending downwardly from the roof;
    a pair of side walls extending between a right side edge and a left side edge of the panel and the opening in the roof of the vehicle on opposite sides of the panel when the panel is raised, wherein the receptacle receives the side walls when a rear portion of the panel is in a lowered position;
    a lifting assembly for selectively raising and lowering the panel including:
        an upper link connected to the panel, wherein the upper link is provided with an engagement feature;
        an intermediate link connected to the receptacle, wherein the intermediate link defines a slot into which the engagement feature is received; and
        an actuator connected to the panel; and
    a rigid rear wall retractable into the vehicle, extending between a rear edge and the opening in the roof of the vehicle when the panel is raised, wherein the panel is raised to increase headroom in the vehicle below the panel, wherein the panel, the side walls and the rear wall covers the opening in the roof when the panel is raised.

2. The panel of claim 1, wherein the rear wall is a rigid panel that has a pair of followers that extend from opposite sides of the rear wall on a lower edge that are received in a track provided in the vehicle below a rear portion of the roof.

3. The panel of claim 1, wherein the engagement feature is moved to an upper portion of the slot when the panel is in a raised position.

4. The panel of claim 1, wherein the engagement feature is moved to a lower portion of the slot when the panel is in a lowered position.

5. A roof panel assembly for a vehicle that has a roof, the roof panel assembly comprising:
- a roof panel having a front portion, a rear portion and two longitudinally extending side portions, wherein the rear portion is spaced from an opening defined in the roof when the rear portion of the roof panel is lifted, and wherein the rear portion of the roof panel engages the opening defined in the roof when the rear portion of the roof panel is in a lowered position;
- two side walls extend between two side portions and the opening, wherein the side walls are received within a receptacle defined within the vehicle when the rear portion of the roof panel is in the lowered position;
- a linkage assembly for supporting the roof panel in a raised position, wherein the linkage assembly includes:
  - a first link attached to the roof panel;
  - a second link defining a first slot configured to receive a first pin that extends through the first link and the second link and provides a sliding connection with the first link; and
  - a third link integrally formed as part of the receptacle, the third link defining a second slot configured to receive a second pin that connects the second link to the third link and provides a sliding connection with the second link; and
- a hinge operatively connecting the front portion of the roof panel to the roof to pivot about a transverse pivot axis, wherein the rear portion of the roof panel is capable of being lifted in a range of positions to provide added head room within the vehicle.

6. The roof panel assembly of claim 5, wherein the first pin is shifted to a lower portion of the first slot and the second pin is shifted to a lower portion of the second slot when the roof panel is in the lowered position.

7. The roof panel assembly of claim 5, wherein the first link is shifted relative to the second link and the first pin is shifted to an upper portion of the first slot when the roof panel is moved to an intermediate position.

8. The roof panel assembly of claim 5, wherein the first link is shifted relative to the second link the first pin is shifted to an upper portion of the first slot and the second pin is shifted to an upper portion of the second slot when the roof panel is raised into a maximum position.

9. The roof panel assembly of claim 5, further comprising a rear wall provided with a pane that is, at least in part, transparent.

\* \* \* \* \*